United States Patent [19]
Fujino et al.

[11] Patent Number: 4,748,468
[45] Date of Patent: May 31, 1988

[54] EXPOSURE DISPLAY DEVICE

[75] Inventors: Akihiko Fujino; Shuji Izumi, both of Sakai; Masaaki Nakai; Hiromu Mukai, both of Kawachinagano; Toshio Yamaki, Osaka; Nobuyuki Taniguchi, Nishinomiya, all of Japan

[73] Assignee: Minolta Camera Kabushiki Kaisha, Osaka, Japan

[21] Appl. No.: 10,967

[22] Filed: Feb. 4, 1987

[30] Foreign Application Priority Data

Feb. 17, 1986 [JP] Japan .................................. 61-30987
Feb. 17, 1986 [JP] Japan .................................. 61-30988

[51] Int. Cl.$^4$ .......................... G03B 3/00; G03B 17/18; G03B 7/28
[52] U.S. Cl. ..................................... 354/402; 354/432; 354/472; 354/475
[58] Field of Search ............... 354/429, 402, 431, 432, 354/471, 474, 472, 475; 356/222, 226

[56] References Cited

U.S. PATENT DOCUMENTS

| 4,309,090 | 1/1982 | Yamada ............................. 354/475 |
| 4,373,793 | 2/1983 | Taniguchi et al. .................. 354/432 |
| 4,448,506 | 5/1984 | Saegusa et al. ..................... 354/431 |
| 4,655,576 | 4/1987 | Yuasa et al. ...................... 354/474 X |

FOREIGN PATENT DOCUMENTS

| 53-19027 | 2/1978 | Japan . |
| 55-35316 | 3/1980 | Japan . |
| 55-40451 | 3/1980 | Japan . |
| 57-30914 | 2/1982 | Japan . |
| 57-38423 | 3/1982 | Japan . |
| 57-42026 | 3/1982 | Japan . |
| 57-86825 | 5/1982 | Japan . |
| 57-115530 | 7/1982 | Japan . |
| 57-120924 | 7/1982 | Japan . |
| 59-28625 | 2/1984 | Japan . |
| 59-28626 | 2/1984 | Japan . |
| 60-162926 | 8/1985 | Japan . |

*Primary Examiner*—W. B. Perkey
*Attorney, Agent, or Firm*—Burns, Doane, Swecker & Mathis

[57] ABSTRACT

An exposure display device for a camera, which can display not only the density of the background to be photographed on a film but also the density of a primary object to be focused with respect to an exposure control value used for exposure control operation. In natural light photography, the brightness of the primary object area at which automatic focus detection is conducted and the brightness of divided object field areas are measured, the density distribution of the primary object area and those of the divided object field areas reproduced on the film are calculated basing on the measurement, and the results are displayed in correspondence to the exposure control value. In flash light photography, the expected brightness of the primary object area and divided object field areas are measured, and the density distribution of the primary object area and object field areas reproduced on the film are calculated and displayed in correspondence to the exposure control value.

12 Claims, 8 Drawing Sheets

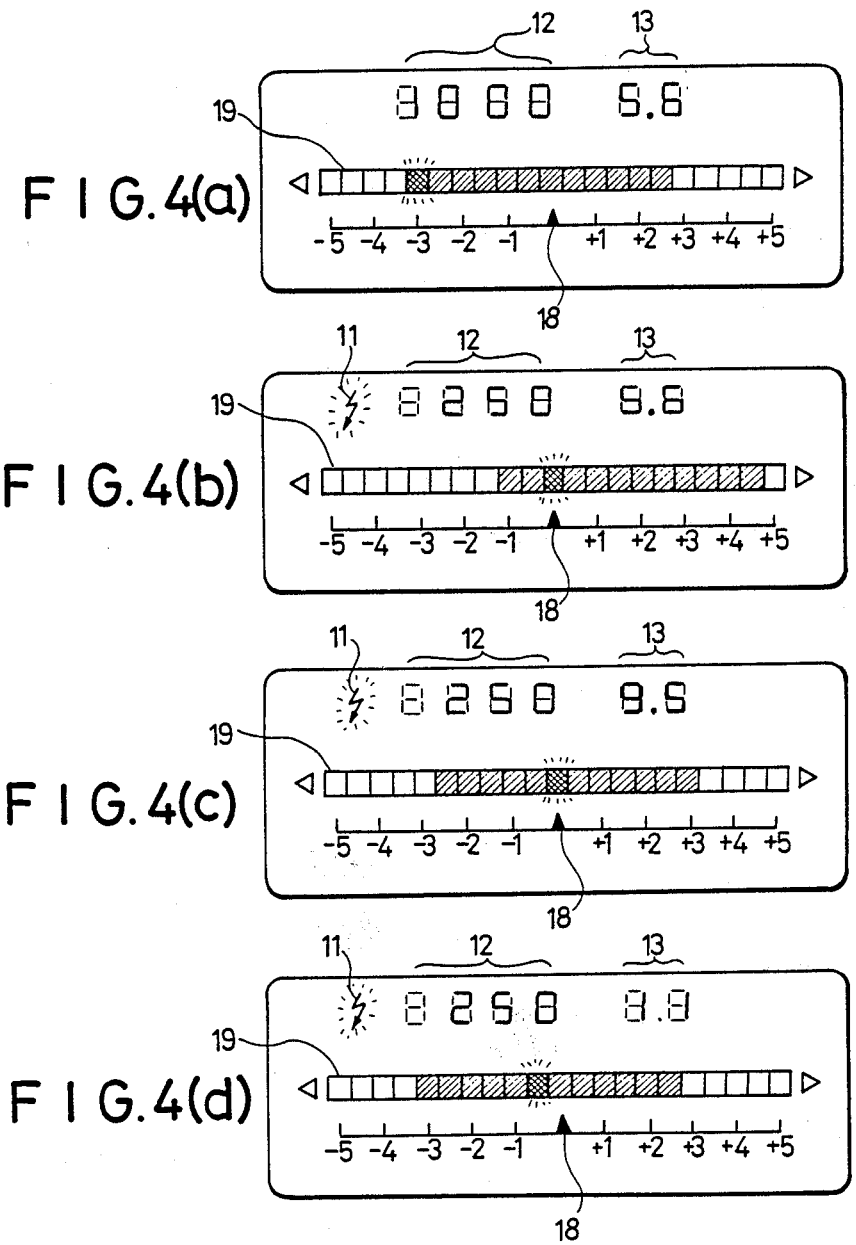

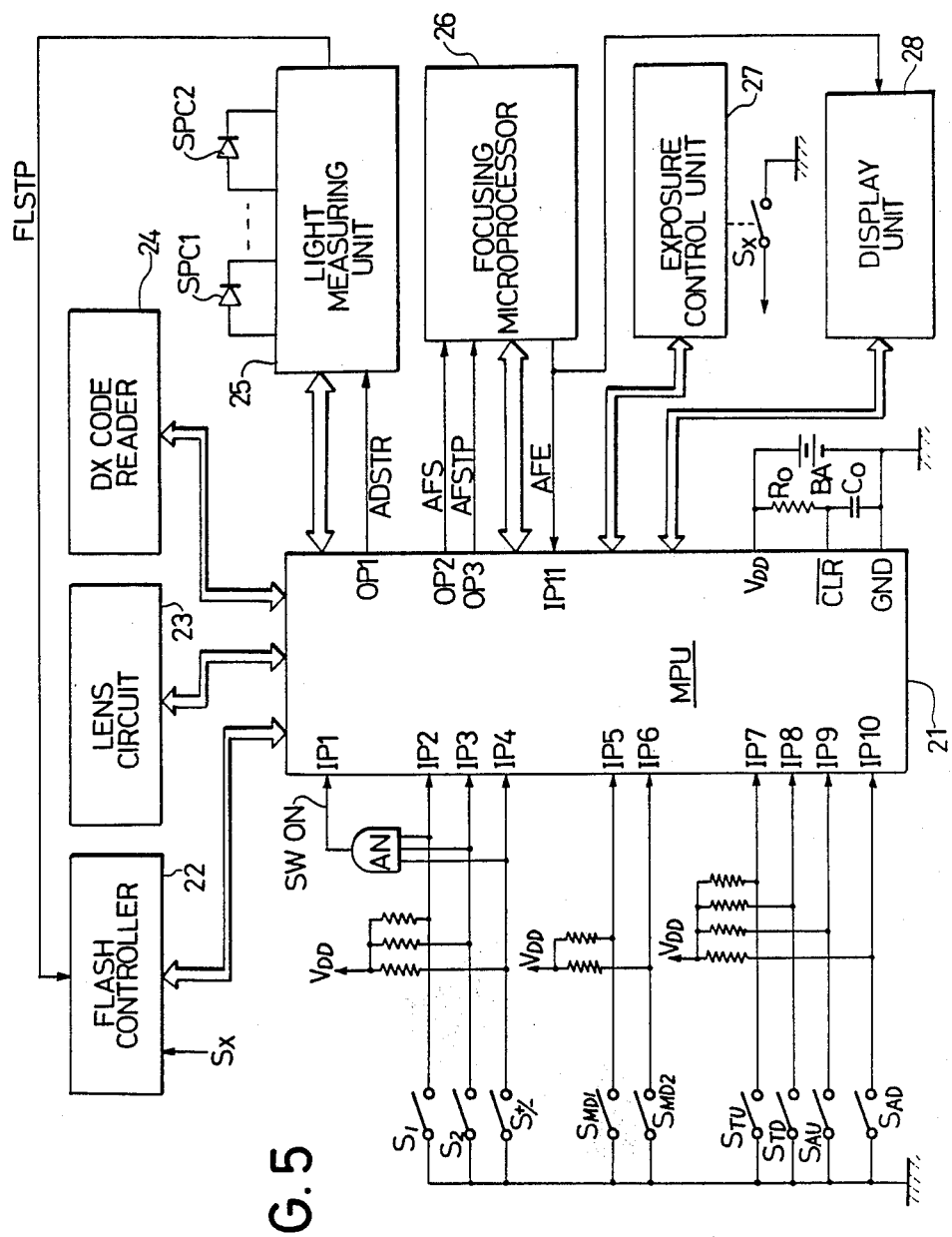
F I G. 5

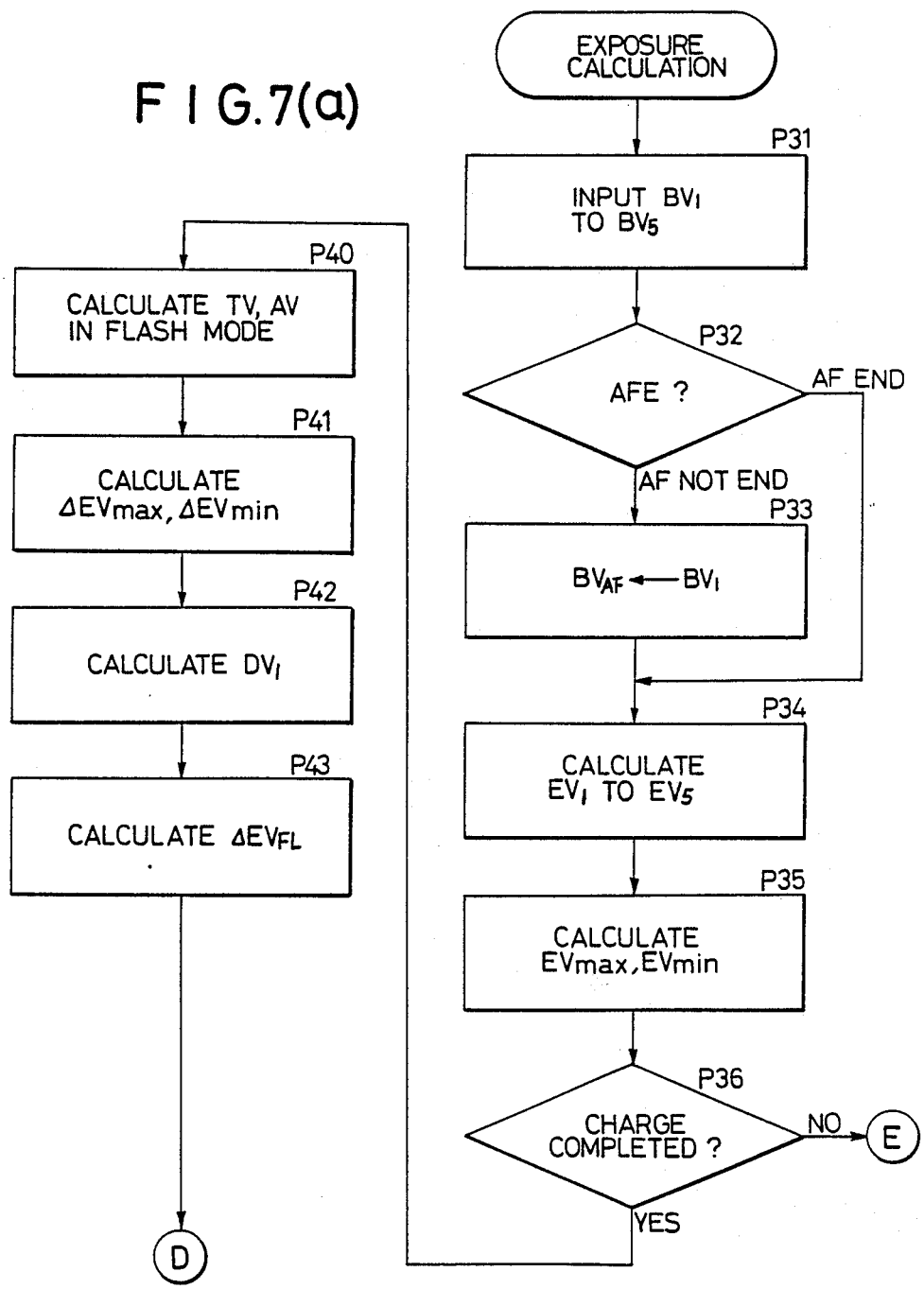

EXPOSURE DISPLAY DEVICE

BACKGROUND OF THE INVENTION

1. Field of the Invention

The present invention relates to an exposure display device for a camera, which can display not only the density of the background to be photographed on a film but also the density of a primary object to be focused with respect to an exposure control value used for exposure control operation.

2. Description of the Prior Art

Normally, conventional cameras having automatic exposure control devices, determine an exposure control value consisting of a proper shutter speed and a proper aperture value on the basis of a brightness of an object field to be photographed. Here, the brightness is determined with average light measuring of the whole object field. Therefore, if the primary object is located in front of a very bright background, for example, if the primary object is under a backlighting condition such as a snow field, the primary object is photographed on a film in under exposure condition. The reason is that the exposure control value is determined with being greatly affected by the brightness of the very bright background. Thus, the dark image of the primary object will be undesirably reproduced on a print.

Then, advanced users of such cameras exert their experience to anticipate the print to be reproduced according to the brightness distribution of the object field and the exposure control value, and correct or change the exposure control value to be actually used from the predetermined value, in order to reproduce the primary object on the print properly. In such case, if both of the brightness of the primary object and that of the background can be recognized in relation to the exposure control value, the correction of the exposure control value will become more easily. Thus, there has been provided a display device which display, the difference between the exposure control value to be used for exposure control and an exposure value corresponding to a brightness measured by a spot light measurement, in relation to film latitude, for example, by Japanese Laid-Open Patent Application No. 57-120924.

However, more information would be necessary for anticipating the brightness condition of the print to be reproduced more easily. For example, the relation between maximum brightness of the object field, minimum brightness thereof, the brightness of the primary object, the exposure control value, and the film latitude would be desirable for anticipating the brightness condition thereof.

On the other hand, it is necessary to decide whether the proper exposure can be obtained by means of the flash device, on the basis of the guide number of the flash device, an aperture value to be controlled, and the distance to the primary object. However, it would require experience and technique to recognize the difference between the brightness of the primary object and that of the background in the flash photography, and to correct or change the exposure control value from the automatically determined value for properly reproduce user's intention. Therefore, a display device would be desired in which the condition to be reproduced on the print in flash photography can be recognized more easily.

SUMMARY OF THE INVENTION

An object of the present invention is to provide a display device for a camera, in which the condition to be reproduced on the print can be recognized more easily in comparison with the conventional device.

Another object of the present invention is to provide a display device for a camera, in which the density distribution of the object field reproduced on a film and the brightness of the primary object can be displayed in relation to the exposure control value.

The other object of the present invention is to provide a display device in which the flash photography according to the user's intention can be more easily.

Further other object of the present invention is to provide a display device in which the density distribution of the object field reproduced on a film can be displayed in relation to the exposure control value used for the flash photography.

Other objects and features of the present invention will become more apparent from the following detailed description taken in conjunction with the accompanying drawings.

BRIEF DESCRIPTION OF THE DRAWINGS

FIGS. 4(a), 4(b), 4(c) and 4(d) are diagrams showing display states of the display panel in flash photographing mode;

FIG. 5 is a block diagram showing electric circuit of the embodiment;

FIGS. 7(a) and 7(b) comprise a flowchart showing exposure calculation routine in FIGS. 6(a) and 6(b)

DETAILED DESCRIPTION OF THE PREFERRED EMBODIMENT

Figure 1:
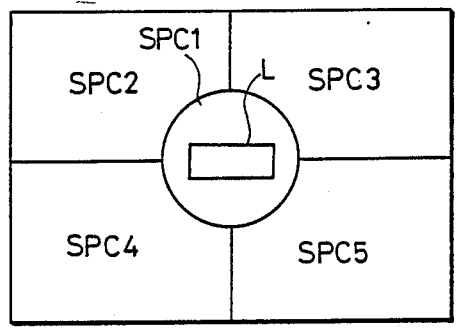
FIG. 1 is a diagram showing a layout of an example of plurality of photosensitive elements in a light measuring device usable in the present invention.

FIG. 1 shows an arrangement of a plurality of photosensitive elements usable in the present invention in relation to the object field to be photographed. In FIG. 1, the object field to be photographed is divided into five sections, and five photosensitive elements SPC1 to SPC5 are located for receiving light coming from each divided sections, respectively. Index L shows a distance measuring area of automatic focus detecting device AF described later. Thus, the distance to an object located within the distance measuring area L is detected by the automatic focus detecting device AF. The distance measuring area L is positioned in the center of the object field so that it is included in an area directed to the photosensitive element SPC1.

Figure 2:
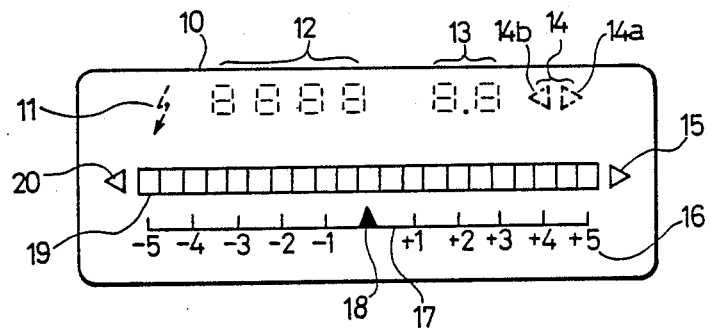
FIG. 2 is a diagram showing a plurality of display sections provided on a display panel of an embodiment of the present invention.

FIG. 2 shows a plurality of display sections in a display panel 10. The display panel 10 is incorporated in a finder optical system for displaying each images of the display sections with a finder image in a finder field. The display panel 10 includes a section 11 for indicating charging condition of a main capacitor of a flash device.

The main capacitor is charged for storing electric power used for flash light emission. If the charge of the main capacitor is not completed, that is, if the electric voltage of the main capacitor does not reach a predetermined level, the section 11 is not indicated in the finder field. On the other hand, if the charge of the main capacitor has been completed, the section 11 is indicated in the finder field with blinking. A shutter speed indicating section 12 and F-number indicating section 13 are provided on the display panel 10 for numerically indicating the shutter speed and the aperture value, respectively. An override indicating section 14 is provided for indicating whether or not the correction of exposure is applied. If the exposure is not corrected, the override indicating section 14 is not indicated. On the other hand, if the exposure is corrected in order to increase the exposure amount, a right side element 14a of the override indicating section 14 is indicated with blinking. If the exposure is corrected in order to decrease the exposure amount, a left side element 14b of the override indicating section 14 is indicated with blinking.

A target exposure value index 18 is provided for indicating a target exposure value determined by combination of a shutter speed indicated by the shutter speed indicating section 12 and an aperture value indicated by the F-number indicating section 13. An exposure value indicating portion 19 consists of 21 indicating elements for indicating a plurality of exposure values calculated in accordance with the outputs of plurality of the photosensitive elements, film sensitivity SV, and the open aperture value AV0 of the mounted lens. If one of the exposure value is calculated, one indicating element corresponding to the calculated exposure value is turned on for indication. Therefore, if an indicating element corresponding to the target exposure value index 18 is turned on, a proper exposure will be obtained on the film. On the other hand, if the other indicating element is turned on, the exposure is in overexposure condition or in underexposure condition by steps corresponding to the distance from the element corresponding to the target exposure value index 18 to the element turned on.

A film latitude indicating index 17 is provided for indicating a range of exposure value within the latitude of film, in the case when the exposure is controlled in accordance with the target exposure value.

Indicating elements 15 and 20 are provided for warning the existence of improper exposure value. If the exposure value calculated on the basis of either of the photosensitive elements is different from the target exposure value over 5 steps in A.P.E.X. standard, each of the indicating elements 15 and 20 are turned on with blinking. For example, if the calculated exposure value is larger than the target exposure value over 5 steps, the indicating element 15 is turned on with blinking. On the other hand, if the calculated exposure value is smaller than the target exposure value over 5 steps, the indicating element 20 is turned on with blinking. Here, it should be noticed that the blinking of the indicating elements 15 and 20 indicates not only the existence of exposure value which is 5 steps apart from the target exposure value, but also the existence of exposure value apart therefrom over the 5 steps.

Figure 3A:
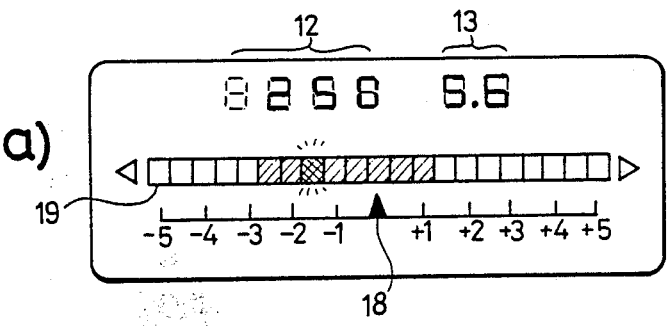
FIGS. 3(a) and 3(b) are diagrams showing display states of the display panel in natural light photographing mode.
Figure 3B:
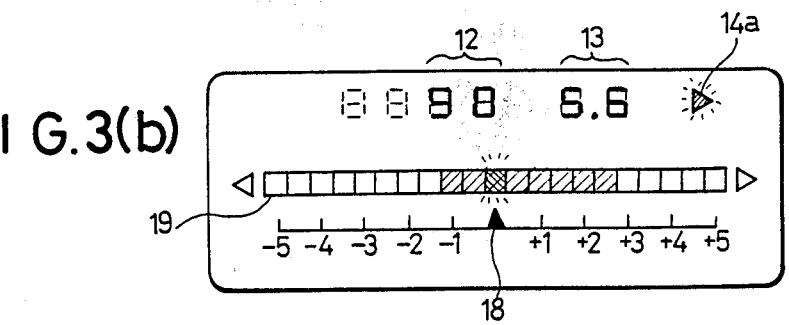

FIGS. 3(a) and 3(b) show an example of the display state when the exposure calculation is performed in aperture priority mode by a known automatic exposure calculation means. In the example, the F-number is manually set to F/5.6, and the proper shutter speed calculated in accordance with the outputs of plurality of photosensitive elements is 1/250 sec. Thus, in FIG. 3(a), "250" is indicated in the shutter speed indicating section 12, and "5.6" is indicated in the F-number indicating section 13. In addition, the minimum and maximum exposure values EVmin and EVmax are indicated by indicating elements in the exposure value indicating portion 19. In the example, the maximum exposure value EVmax is larger than the target exposure value by +1 step, while the minimum exposure value is smaller than the target exposure value by −2.5 steps. An indicating element is turned on with blinking for indicating the exposure value corresponding to the primary object. The exposure value corresponding to the primary object is obtained by the output of a photosensitive element SPC1 which is located for receiving the light coming from the center portion of the object field to be photographed. In the example, the exposure value corresponding to the primary object is smaller than the target exposure value by −1.5 steps.

Therefore, the display state shown in FIG. 3(a) indicates that, all of the measured brightness in the object field to be photographed are covered within the film latitude, and however, the primary object will be photographed in slightly under-exposure condition if the exposure amount is controlled in accordance with the target exposure value obtained by the automatic exposure calculation means in aperture priority mode.

In the above case, it is possible to manually correct or modify the target exposure value in order to obtain the proper exposure amount to the primary object. For example, if the shutter speed is manually shifted from 1/250 sec. to 1/90 sec., the exposure value corresponding to the primary object coincides with the target exposure value index 18 as shown in FIG. 3(b), so that the primary object is photographed with proper exposure amount.

The above explanation is performed in the case of aperture priority mode of the automatic exposure calculation, however, similar display state as shown in FIGS. 3(a) and 3(b) is obtained in shutter speed priority automatic exposure calculation mode and in program exposure calculation mode. Furthermore, in manual exposure setting mode, manual modification of combination of preset shutter speed and preset aperture value is effective for obtaining proper exposure to the primary object with reference to the display of the display panel 10.

Next, the explanation of the display state in the display panel 10 will be performed in the flash photography mode. The display state of FIG. 4(a) shows that the primary object located in the center of the object field will be in under-exposure condition since the brightness of background thereof is higher than that of the primary object, for example in backlight condition. In this case, daylight synchronized flash is effective for obtaining proper exposure to the primary object, if the primary object is located within a flash permissible distance range from the maximum permissible distance of automatic light controlled flash device to the minimum permissible distance thereof. For example, FIG. 4(b) shows a display state in which the charge of the main capacitor of the automatic control flash device has been completed in the same condition as shown in FIG. 4(a). Here, since the target exposure value is calculated in the aperture priority mode, the manually set aperture value of F/5.6 is indicated in the F-number indicating section 13, while the shortest shutter speed for synchronized with the flash light emission, that is 1/250 sec., is indicated in the shutter speed indicating section 12. In this case, the target exposure value is modified +2 steps towards the over-exposure side by use of the flash device, the exposure value indication based on plurality of measured brightnesses in the exposure value indicating section 19 is also shifted +2 steps towards the over-exposure side. This means that the primary object is located within the flash permissible distance range and the proper exposure to the primary object will be obtained by use of the flash device.

However, FIG. 4(b) indicates that the background of the primary object will be photographed in over-exposure condition as the maximum brightness among the plurality of measured brightnesses is out of the latitude of the film. In the case, the over-exposure condition of the background can be improved by means of modifying the F-number by −1.5 steps from the indicated F-number of F/5.6 to the F-number of F/9.5 as shown in FIG. 4(c). The proper exposure to the primary object can be maintained since the primary object is located within the flash permissible distance range. Therefore, the exposure value corresponding to the primary object is indicated as coinciding with the target exposure value index 18 as shown in FIG. 4(c).

If the F-number of F/9.5 as shown in FIG. 4(c) is modified to the F-number of F/11, the display state of the display panel 10 is as shown in FIG. 4(d). Therefore, exposure values indicated by the exposure value indicating portion 19 is shifted from the condition shown in FIG. 4(c) to under-exposure side by −0.5 step, and the exposure value corresponding to the primary object indicated by flashing is also shifted to under-exposure side by −0.5 step. This means that the distance to the primary object is larger than the maximum permissible distance determined in accordance with the controlled aperture size (F-number).

The above explanation in the flash photography mode is performed in the case when the exposure value is calculated in the aperture priority automatic exposure calculation mode, similar display is indicated in the other mode, such as the shutter speed priority automatic exposure calculation mode, the program exposure calculation mode, and the manual mode. Especially in the program exposure calculation mode, since the correction or modification of the exposure value causes the shifting of the combination of shutter speed and aperture value along a predetermined program line, the operation similar to that in the aperture priority automatic exposure calculation mode will be enable in the flash photography mode.

Here, in the daylight synchronized flash photography used when the primary object is darker than the background thereof, the primary object will be illuminated not only by the flash light but also by the natural light (ambient light). Therefore, the exposure value corresponding to the primary object can be indicated by calculation based on both of the illumination of the flash light component and that of the ambient light component in the embodiment as described later. Therefore, the correct indication of the exposure value corresponding to the primary object can be performed in the case of flash photography mode in which the controlled shutter speed is longer than the flash synchronized shutter speed (1/250 sec.). In this case, the illumination of the primary object by the ambient light is increased in comparison with the flash synchronized shutter speed (1/250 sec.). This will be explained in detail later.

Next, the construction of display unit drive circuit of the embodiment will be described with reference to the block diagram of FIG. 5.

In FIG. 5, a microprocessor (called "MPU" hereinafter) 21 controls exposure control portion, automatic focusing portion, and the display unit. The MPU 21 has input ports IP1–IP11, output ports OP1–OP3, a power supply terminal $V_{DD}$, and a clear terminal CLR. A power supply circuit consisting of a resistor $R_0$ and a capacitor $C_0$ is provided for supplying a stabilized power for the power supply terminal $V_{DD}$, and for supplying a short negative clear pulse for the clear terminal CLR immediately after the power battery BA is mounted on the camera.

A flash controller 22 is provided for controlling the flash light emission, and sends, to the MPU 21, a guide number signal GV representing a guide number of the flash device and charge completion signal when the charge of the main capacitor is completed.

A lens circuit 23 located in the lens sends, to the MPU 21, the open aperture value information AV0, the minimum aperture value information AVmin, the maximum aperture value information AVmax, the distance information DV corresponding to the in-focus position of the lens.

A DX code reader 24 is provided for reading a film sensitivity information SV recorded onto the film cartridge to send the film sensitivity information SV to the MPU 21.

A light measuring unit 25 is provided for measuring the intensity of light coming from the object field with dividing the object field into a plurality of sections. The light measuring unit 25 includes five photosensitive elements SPC1–SPC5 shown in FIG. 1, and starts its light measuring operation in response to a measurement start signal ADSTR of the MPU 21. The brightness information BV1–BV5 each measured by the photosensitive elements SPC1–SPC5 are sent to the MPU 21 from the light measuring unit 25. In the flash photography mode, when the exposure amount detected on the basis of the measured brightness information reaches a predetermined proper level, the light measuring unit 25 produces a flash stop signal FLSTP to the flash controller 22 for interrupting the flash light emission.

A focusing microprocessor 26 provided in the automatic focusing means AF controls the distance measurement calculation and the lens shifting operation. When the focusing operation is completed, a focusing end signal AFE is sent from the focusing microprocessor 26 to the MPU 21. Here, the start of the focusing operation is controlled by an AF start signal AFS produced by the MPU 21, and the termination thereof is controlled by an AF stop signal AFSTP produced by the MPU 21.

An exposure control unit 27 is provided for controlling the exposure, and controls the exposure in accordance with a shutter speed information TV and an aperture information AV produced by the MPU 21. When a movement of first curtain of a focal plane shutter is completed, a flash trigger switch SX is closed for starting the flash light emission.

A display unit 28 including the display panel 10 shown in FIGS. 2, 3(a), 3(b), and 4(a) to 4(d) indicates a shutter speed, an aperture value, charging condition of the main capacitor of the flash device, the validity of correction of the exposure value, the difference ΔEVmax between the maximum exposure value EVmax and the target exposure value EV, the difference ΔEVmin between the minimum exposure value EVmin and the target exposure value EV, and the difference $EV_{AF}$ between the exposure value corresponding to the brightness of the primary object and the target exposure value EV, on the basis of the information transmitted from the MPU 21. The indication of the difference $EV_{AF}$ is controlled by the focusing end signal AFE as described later.

An automatic focusing switch S1, a shutter release switch S2, and exposure correction switch S+/− are provided. The above three switches S1, S2 and S+/− are connected to an AND gate AN. Therefore the AND gate AN produces a high output when all of the switches are in OFF state. If at least one of the switches is turned ON, the output of the AND gate AN becomes low (SW ON). When the output of the AND gate AN becomes low (SW ON), the light measuring operation of the light measuring unit 25 is started, and the hold time of the MPU 21 is extended.

Mode setting switches $S_{MD1}$ and $S_{MD2}$ are provided for selecting the exposure calculation mode, and the combination of the mode setting switches $S_{MD1}$ and $S_{MD2}$ selects one of the exposure calculating mode, among the aperture priority automatic exposure calculation mode (A mode), shutter speed priority automatic exposure calculation mode (S mode), program automatic exposure calculation mode (P mode), and manual mode (M mode).

A pair of shutter speed setting switches $S_{TU}$ and $S_{TD}$ are provided for changing the shutter speed indicated in the shutter speed indicating section 12, while a pair of aperture setting switches $S_{AU}$ and $S_{AD}$ are provided for changing the F-number indicated in the F-number indicating section 13.

The modification or correction of the exposure value is performed by operating the shutter speed setting switches $S_{TU}$ and $S_{TD}$ while holding the exposure correction switch S+/− to ON state.

Figure 6A:
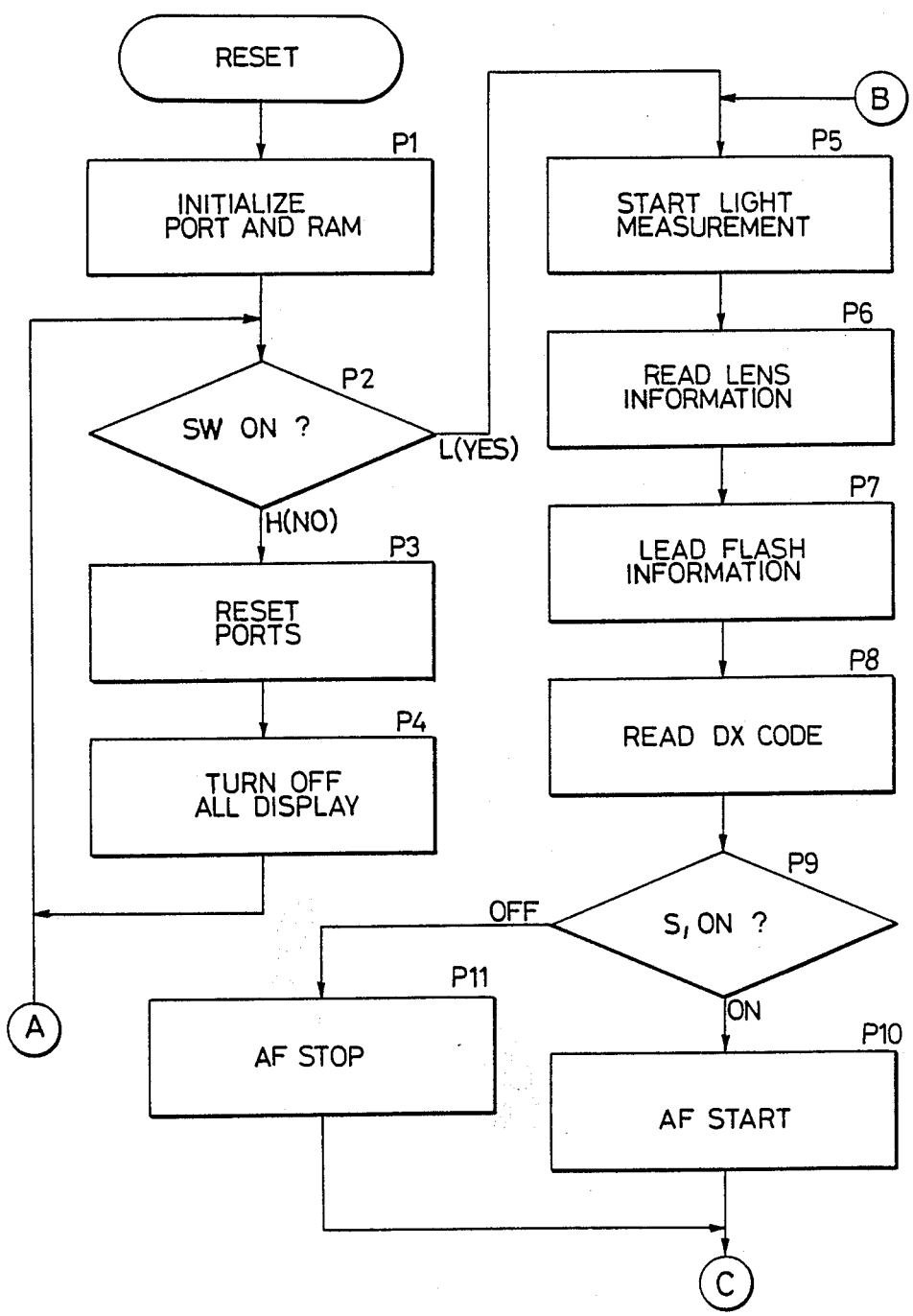
FIGS. 6(a) and 6(b) comprise a flowchart showing operation of microprocessor of the embodiment.
Figure 6B:
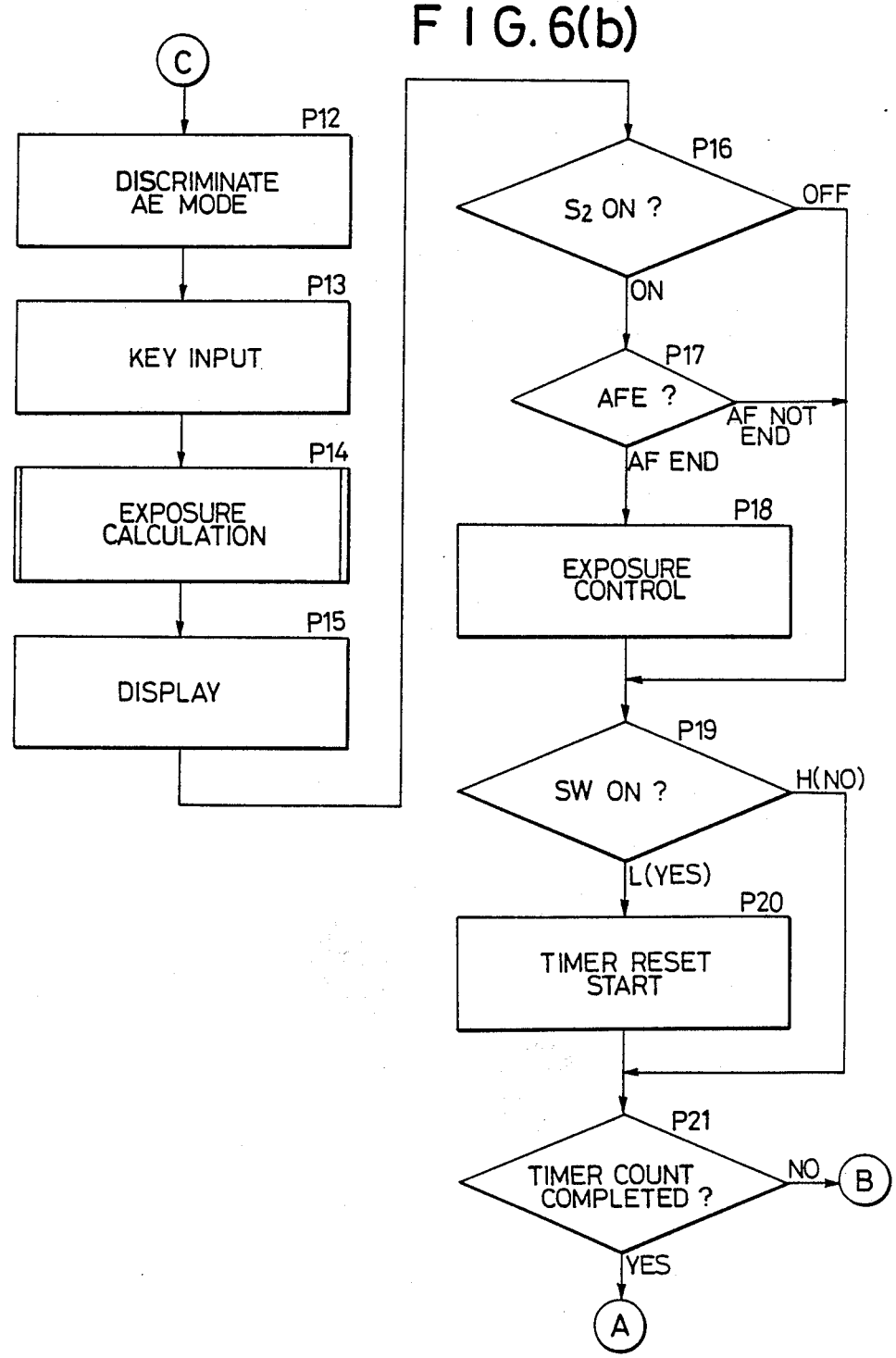

FIG. 6 shows the operation of the MPU 21. If the power battery BA is mounted on the camera, the short negative clear pulse is sent to the clear terminal CLR of the MPU 21 for initializing the MPU 21, and thereafter the clear terminal CLR becomes high level for starting the operation shown in FIG. 6. In step P1, the MPU 21 sets all of the input and output ports and random access memory (RAM) in the MPU 21 into respective initial condition. The MPU 21 discriminates the output (SW ON) of the AND gate AN in step P2 and resets all of the ports in step P3 if the output is high, namely if all of the switches S1, S2, and S+/− are OFF states. The MPU 21 turns off all of the displays on the display panel 10 in step P4, and then the program returns to the step P2.

If the output (SW ON) of the AND gate AN is discriminated to be low in step P2, the program proceeds to step P5 for starting the light measuring operation of the light measuring unit 25. Namely, the MPU 21 produces a measurement start signal ADSTR of low level for performing the light measuring operation once. In the following step P6, the MPU 21 reads, from the lens circuit 23, the open aperture value AV0, the minimum aperture value AVmin, and the distance information DV. Furthermore, the MPU 21 reads the guide number information GV and the charge completion signal from the flash controller 22 in step P7, and also reads the film sensitivity information SV from the DX code reader 24 in step P8.

In step P9, the MPU 21 discriminates the ON/OFF state of the AF start switch S1. If the AF start switch S1 is in ON state, the MPU 21 produces the AF start signal AFS of short low level in step P10 for starting the automatic focusing operation of the focusing microprocessor 26. On the other hand, if the AF start switch S1 is in OFF state in step P9, the program goes to step P11 for producing the AF stop signal AFSTP of short low level for interrupting the automatic focusing operation.

Next, in step P12, the MPU 21 discriminates the selected exposure calculation mode on the basis of the conditions of mode setting switches $S_{MD1}$ and $S_{MD2}$. In the following step P13, the MPU 21 discriminates the conditions of switches S+/−, $S_{TU}$, $S_{TD}$, $S_{AU}$, and $S_{AD}$ for determining the exposure correction value (override value), the set shutter speed and the set F-number.

Then the shutter speed and the F-number to be controlled in exposure are calculated in step P14 on the basis of the above read information and plurality of light measuring values. This operation in step P14 will be explained in detail later. The MPU 21 sends data to be indicated on the display panel 10 in the display unit 28 for displaying the shutter speed, the F-number and so on as shown in FIGS. 3(a) and 3(b).

In the following steps P16 and P17, the MPU 21 discriminates the conditions of the shutter release switch S2 and the focusing end signal AFE, respectively. If it detects that the ON state of the shutter release switch S2 and the production of the focusing end signal AFE, the program proceeds to step P18 for performing the exposure control operation of the exposure control unit 27. On the other hand, if the shutter release switch S2 is in OFF state or if the focusing end signal AFE is not produced, the program goes to step P19 with skipping the step P18.

In step P19, the MPU 21 discriminates the output (SW ON) of the AND gate AN. If the output of the AND gate AN is low, that is, if at least one of the AF start switch S1, the shutter release switch S2, and the exposure correction switch S+/− is in ON state, the MPU 21 resets and starts a timer for counting 10 sec. in step P20. In the following step P21, the MPU 21 detects the counted time of the timer. If the counted time does not reach 10 sec., the program returns to step P5 for repeating the light measuring operation. If the counted time reaches 10 sec. in step P21, the program returns to step P2. Then the MPU 21 resets all of ports in step P3, and turns off all of the displays in step P4.

Figure 7B:
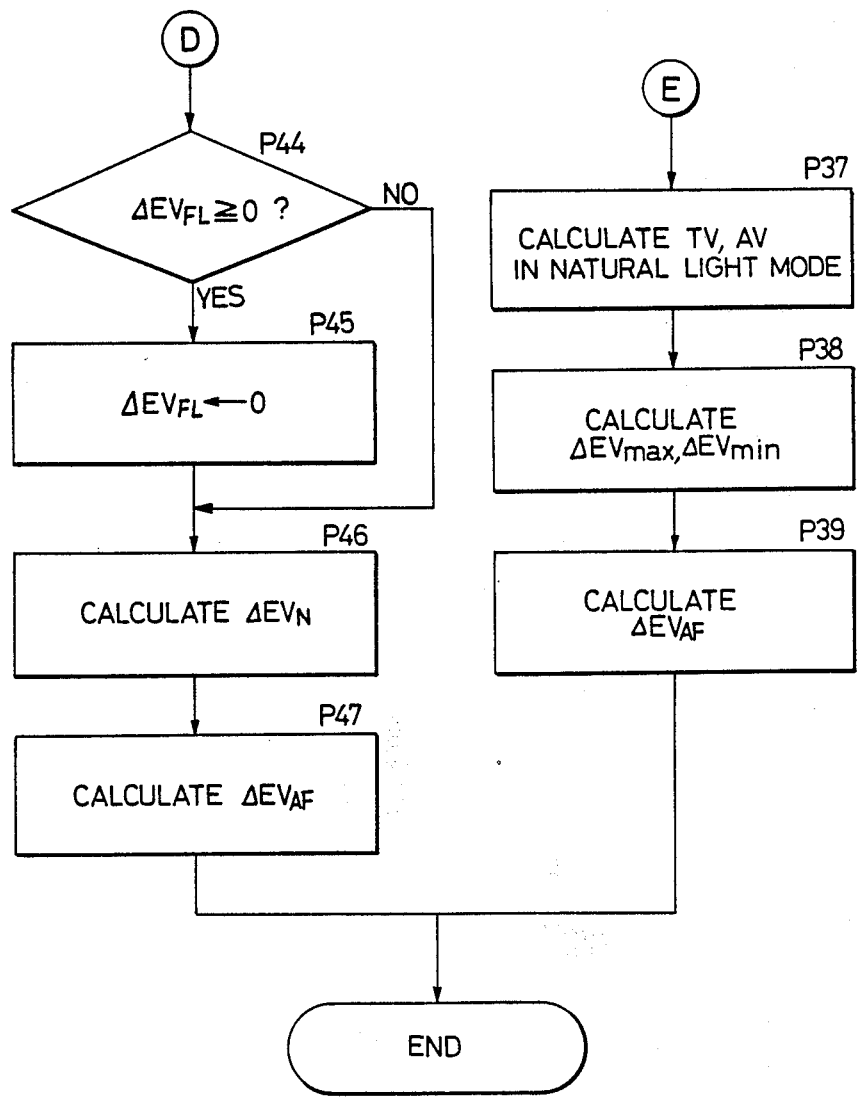

FIG. 7 shows detailed operation of the exposure calculation routine of step P14. In the exposure calculation routine shown in FIG. 7, the brightness values BV1 to BV5 corresponding to the outputs of plurality of photosensitive elements SPC1 to SPC5 are read, and the controlled shutter speed TV and the controlled aperture value AV corresponding to the target exposure value EV are calculated in accordance with the selected exposure calculation mode, the film sensitivity information SV and the distance information DV. Furthermore, the maximum and minimum exposure values EVmax and EVmin among plurality of measured exposure values EV1 to EV5 corresponding to the plurality of light measuring values BV1 to BV5, and the differences ΔEVmax and ΔEVmin between the maximum and minimum exposure values EVmax and EVmin and the target exposure value EV, respectively, are calculated. Additionally, the exposure value $EV_{AF}$ corresponding to the primary object to which the photographing lens should be focused and the difference $\Delta EV_{AF}$ between the exposure value $EV_{AF}$ of the primary object and the target exposure value EV are calculated.

In step P31 of FIG. 7, the MPU 21 reads the plurality of brightness values BV1 to BV5. Then the MPU 21 discriminates the production of the focusing end signal AFE in step P32, and the MPU 21 stores the brightness value BV1 into a memory BVAF in step P33 if the signal is not produced. Thus the brightness value BV1 in the center of the object field when the automatic focusing operation is completed, that is the brightness of the primary object, is stored in the memory $BV_{AF}$.

In the next step P34, respective exposure values EV1 to EV5 and $EV_{AF}$ are calculated in accordance with the brightness values BV1 to BV5 and $BV_{AF}$. The following calculations are performed;

$$EV1 = BV1 + AV0 + WVi + SV - EXP$$

$$EV2 = BV2 + AV0 + WVi + SV - EXP$$

$$EV3 = BV3 + AV0 + WVi + SV - EXP$$

$$EV4 = BV4 + AV0 + WVi + SV - EXP$$

$$EV5 = BV5 + AV0 + WVi + SV - EXP$$

$$EV_{AF} = BV_{AF} + AV0 + WVi + SV - EXP$$

Here, AV0 represents open aperture value of the photographing lens; WVi represents brightness measurement error in open aperture light measurement; SV represents the film sensitivity; and EXP represents the exposure correction amount (override amount).

In step P34, the exposure value $EV_{AF}$ corresponding to the primary object is calculated even if the automatic focusing operation has been completed. The reason is that the exposure value $EV_{AF}$ is modified according to the change of the film sensitivity SV and the exposure correction amount EXP.

Then the MPU 21 calculates the maximum exposure value EVmax and the minimum exposure value EVmin among the plurality of exposure values EV1 to EV5 and $EV_{AF}$ in step P35.

In the following step P36, the MPU 21 detects the charge condition of the main capacitor in the flash controller 22. If the charge completion of the main capacitor is not detected in step P36, program goes to step P37 and calculates the controlled shutter speed TV and the controlled aperture value AV according to the known exposure calculation in natural light photography on the basis of the exposure values EV1 to EV5, the selected exposure calculation mode, and the plurality of set values. Then, program goes to step P38 and calculates the differences ΔEVmax and ΔEVmin between the maximum and minimum exposure values EVmax and EVmin and the target exposure value EV (=TV+AV) based on the following equations;

$$\Delta EVmax = EVmax - (TV + AV)$$

$$\Delta EVmin = (TV + AV) - EVmin$$

There values ΔEVmax and ΔEVmin represent the overexposure amount of the highest brightness portion and the under-exposure amount of the lowest brightness portion, and are used for indication of the exposure value indicating section 19.

The difference $\Delta EV_{AF}$ between the exposure value $EV_{AF}$ corresponding to the primary object and the target exposure value EV is calculated in step P39 based on the following equation;

$$\Delta EV_{AF} = (TV + AV) - EV_{AF}$$

The difference $\Delta EV_{AF}$ is used for indication of the exposure value indicating section 19, and the indicating element corresponding to the difference $\Delta EV_{AF}$ is turned on with flashing as described later.

If the charge completion of the main capacitor is detected in step P36, the program goes to step P40 for calculating the controlled shutter speed TV and the controlled aperture value AV according to the known exposure calculation in flash photography, as described above. In the following step P41, ΔEVmax and ΔEVmin are calculated as same as explained in step P38 for indication. And, the maximum permissible distance DV1 of the automatic control flash device is calculated by the following equation in step P42;

$$DV1 = IV + SV - AV - EXP$$

Here, IV represents the guide number of the flash device; SV represents the film sensitivity; AV represents the aperture value; and EXP represents the exposure correction amount.

In the following step P43, the exposure error value $\Delta EV_{FL}$ when the primary object is illuminated only by the flash device by means of subtracting the distance information DV with the maximum permissible distance DV1. The MPU detects whether the exposure error value $\Delta EV_{FL}$ is negative or not in step P44. If the exposure error value $\Delta EV_{FL}$ is not negative, the exposure error value $\Delta EV_{FL}$ is set to zero in step P45. If the exposure error value $\Delta EV_{FL}$ is negative, step P45 is skipped. This means that proper exposure amount to the primary object can be obtained only by the flash light, since the primary object is located nearer than the maximum permissible distance of the flash device and the flash light emission is interrupted in accordance with the result of TTL light measurement.

In step P46, the exposure error value $\Delta EV_N$ produced when the primary object is illuminated only by the ambient light (natural light) is calculated. This calculation is as same as that performed in step P39 in the natural light photography mode.

The exposure error value $\Delta EV_{FL}$ when the primary object is illuminated only by the flash light and the exposure error value $\Delta EV_N$ when the primary object is illuminated only by the natural light have been calculated as described above. Then, the exposure error value $\Delta EV_{AF}$ when the primary object is illuminated by both of the flash light and the natural light is calculated and stored in a memory as indicating data $\Delta EV_{AF}$ in step P47. The calculation is as follows;

$$\Delta EV_{AF} = \log_2 (2^{\Delta EV_{FL}} + 2^{\Delta EV_N})$$

For example, if the exposure error value $\Delta EV_{FL}$ is $-1$ and the exposure error value $\Delta EV_N$ is $-1$, $$\Delta EV_{AF} = \log_2 (2^{-1} + 2^{-1}) = 0$$

and the proper exposure can be obtained to the primary object if illuminated by both of the flash light and the natural light.

The controlled shutter speed TV, the controlled aperture value AV, the differences ΔEVmax and ΔEVmin between the maximum and minimum exposure values and the target exposure value, the difference $\Delta EV_{AF}$ between the exposure value corresponding to the primary object and the target exposure value are informed to the display unit 28 for indication. Here, since the difference $\Delta EV_{AF}$ is displayed only in automatic focusing completion condition, the display unit 28 is controlled by the focusing end signal AFE produced by the MPU 21.

Figure 8:
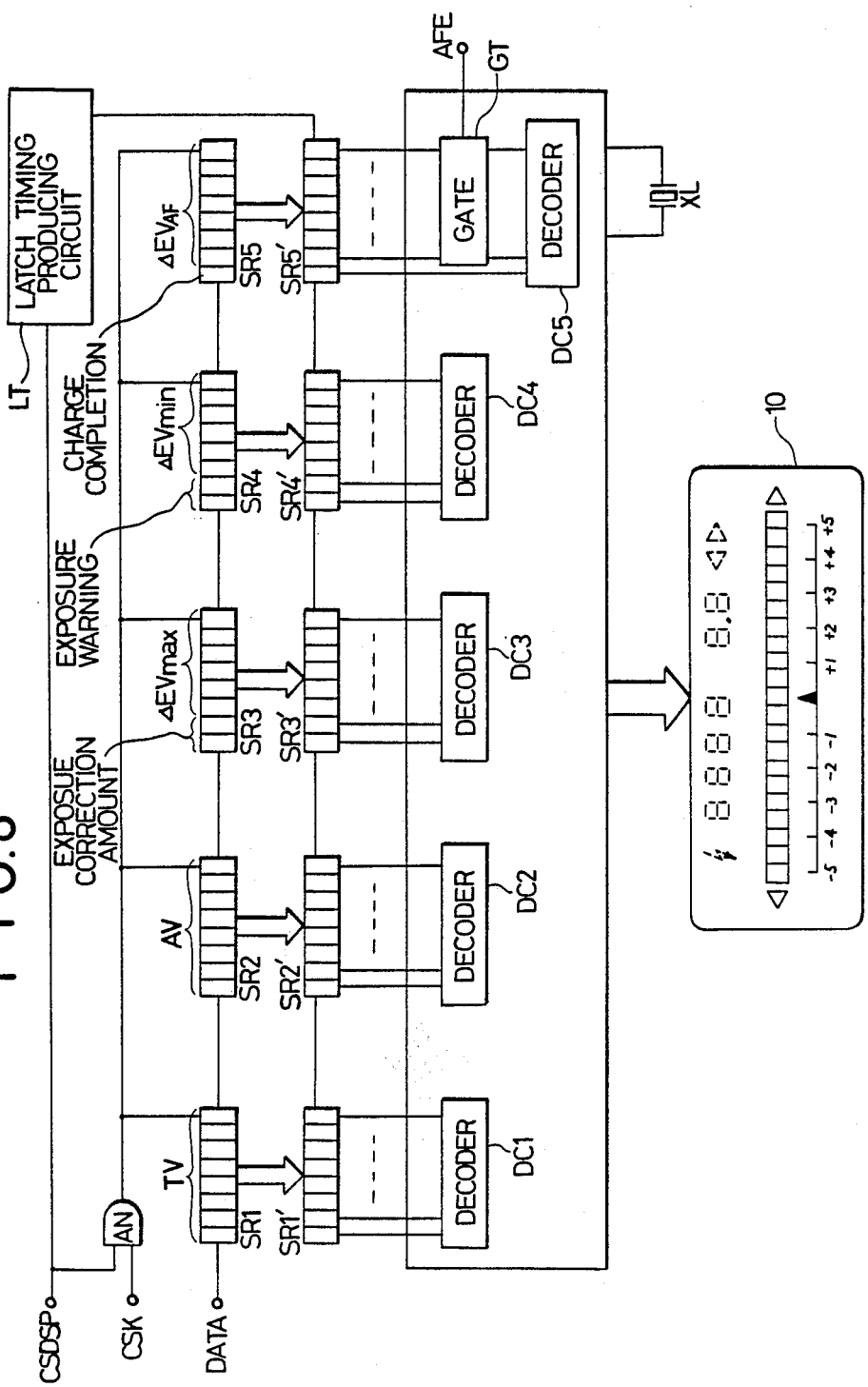
FIG. 8 is a block diagram of display unit drive circuit of the embodiment.

FIG. 8 is a block diagram of the display panel drive circuit included in the display unit 28. The display panel drive circuit is provided for controlling the display condition of the display panel 10. In FIG. 8, SR1 to SR5 represent shift registers, respectively, and the outputs thereof are latched by the respective latch circuits SR1' to SR5'. Decoders DC1 to DC5 are connected to the outputs of the latch circuits SR1' to SR5', respectively, in order to drive the plurality of indicating elements in the display panel 10. However, a gate circuit GT is connected to the output of the latch circuit SR5' (excepting for the charge completion signal indicating output of the latch circuit SR5') in order that the output of the latch circuit SR5' is transmitted to the decoder DC5 only when the focusing end signal AFE is produced for opening the gate circuit GT. A crystal oscillator XL produces clock pulses supplied for the display panel drive circuit, and the output of the decoder DC5 is controlled to synchronize with pulse signals formed by dividing the clock pulses for indication with flashing.

The operation of the display panel drive circuit will be explained below. When a display select signal CSDSP produced by the MPU 21 becomes high, clock signals CSK are transmitted to the shift registers SR1 to SR5, respectively, and the indication data DATA are sent from the MPU 21 to the shift registers SR1 to SR5. Then, when all data are sent to the shift registers SR1 to SR5, the display select signal CSDSP becomes low and latch pulses are produced by the latch timing producing circuit LT for transmitting the data stored in the shift registers SR1 to SR5 to the respective latch circuits SR1' to SR5'. These data are decoded by the respective decoders DC1 to DC5, and are displayed in the display panel 10. However, the data latched by the latch circuit SR5' (excepting for the charge completion signal) are transmitted to the decoder DC5 and are displayed only when the gate circuit GT is opened by the focusing end signal AFE.

In the above embodiment, the differences $\Delta EVmax$, $\Delta EVmin$, and $\Delta EV_{AF}$ are displayed relatively to the target exposure value EV, and however, the present invention should not be limited to such construction. For example, such construction can be applied that the exposure values are displayed in an absolute scale, and that indices indicating the target exposure value and the above differences are displayed on the absolute scale. In the construction, the index indicating the target exposure value should be shifted on the absolute scale in accordance with the measured brightness values, and the index indicating the film latitude should be also shifted in accordance with the shifting of the index indicating the target exposure value.

Additionally, in the embodiment as explained above, the index indicating the film latitude may be altered in accordance with the film loaded in the camera.

Furthermore, although the distance measuring area L of the automatic focus detecting device AF is smaller than a light measuring area covered by the photosensitive element SPC1 in the embodiment, the present invention is not limited to such construction. The distance measuring area L can be coincided with the light measuring area, or can be larger than the light measuring area. In addition, the output of the photosensitive element provided for detecting the distance to the primary object can be used for light measuring value in the area.

Although the flash light emission is terminated in accordance with the TTL light measuring value in the flash device of the embodiment, the present invention is effective when the other flash device is used. For example, the amount of light emitted by the flash device can be controlled by the known flashmatic control device, by the amount of light received without passage of the photographing lens, or by the manually setting amount.

It would be enable to construct so that the preliminary flash light emission is performed during the automatic focusing operation, and the density of the primary object reproduced on the film by the flash light can be displayed on the density distribution of the object field to be photographed on the basis of the light measuring result of the reflected preliminary flash light. In such construction, if the light measuring value corresponding to the center of the object field is stored as the light measuring value corresponding to the primary object, it is possible that the photographing area can be changed with storing proper exposure value to the primary object after the light measuring operation has been terminated. On the other hand, if the brightness of the object field is measured into a plurality of sections and the plurality of brightnesses of each divided sections are stored, it is possible that the photographing area can be changed with indicating the brightness of the primary object and that of the background based on the stored brightnesses.

In a camera in which the information relating to the amount of light emitted from the flash device or the distance information relating to the distance to the primary object is not produced, the medium density of the density distribution reproduced on the film can be indicated as the density of the primary object.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. Exposure display device for a camera including a photographing lens, comprising:
   means for measuring the brightness of an object field to be photographed by the photographing lens by dividing the object field into a plurality of sections to produce a plurality of brightness signals corresponding to the brightness of each section;
   means for focusing the photographing lens with respect to a primary object located in a predetermined focusing area;
   means for calculating a controlled exposure value used in the photographing operation of the camera, and an exposure value range corresponding to the brightness distribution in the object field reproduced on a film on the basis of the plurality of brightness signals; and
   means for displaying the controlled exposure value, the exposure value range, and an exposure value corresponding to the brightness in the predetermined section of the object field corresponding to the predetermined focusing area.

2. Exposure display device as claimed in claim 1, wherein the displaying means includes means for indicating a shutter speed and an aperture value corresponding to the controlled exposure value, and means for displaying the exposure value range determined between minimum and maximumn exposure values corresponding to minimum and maximum brightnesses among the plurality of brightnesses.

3. Exposure display device as claimed in claim 2, wherein the shutter speed and aperture value indicating means includes means for numerically indicating a shutter speed and an aperture value corresponding to the controlled exposure value.

4. Exposure display device as claimed in claim 2, wherein the exposure value range display means includes means for displaying the exposure value range on a predetermined scale, and wherein the display means further includes means for displaying, in a display form different from that of the exposure value range, the exposure value corresponding to the brightness in the predetermined section of the object field corresponding to the predetermined focusing area on the scale.

5. Exposure display device as claimed in claim 4, wherein the exposure value range display means and the means for displaying the exposure value corresponding to the brightness in the predetermined section of the object field include a plurality of display elements arranged in correspondence with each exposure value, means for displaying the plurality of display elements corresponding to the exposure value range, and means for displaying one of the plurality of display elements which corresponds to the exposure value corresponding to the brightness in the predetermined section of the object field.

6. Exposure display device as claimed in claim 5, wherein the plurality of display elements display means includes means for turning on the plurality of display elements, and wherein the means for displaying one of the plurality of display elements includes means for flashing the one display element.

7. Exposure display device for a camera including a photographing lens, comprising:
means for measuring the brightness of an object field to be photographed by the photographing lens by dividing the object field into a plurality of sections to produce a plurality of brightness signals corresponding to the brightness of each section;
means for focusing the photographing lens with respect to a primary object located in a predetermined focusing area;
means for producing a controlled exposure value used in the photographing operation of the camera in flash photography;
means for calculating an exposure value range corresponding to the brightness distribution in the object field reproduced on a film in the flash photography on the basis of the plurality of brightness signals and the controlled exposure value;
means for calculating an exposure value corresponding to the brightness, reproduced on a film in the flash photography, in a predetermined section of the object field corresponding to the predetermined focusing area; and
means for displaying the exposure value range, the controlled exposure value and the exposure value corresponding to the brightness in the predetermined section of the object field.

8. Exposure display device as claimed in claim 7, wherein the exposure value range calculating means includes means for calculating the exposure value range determined between minimum and maximum exposure values corresponding to minimum and maximum brightnesses among the plurality of brightnesses.

9. Exposure display device as claimed in claim 7, wherein the display means includes means for numerically indicating a shutter speed and an aperture value corresponding to the controlled exposure value.

10. Exposure display device as claimed in claim 9, wherein the display means further includes means for displaying the exposure value range on a predetermined scale, and means for displaying, in a display form different from that of the exposure value range, the exposure value corresponding to the brightness in the predetermined section of the object field corresponding to the predetermined focusing area on the scale.

11. Exposure display device as claimed in claim 10, wherein the exposure value range display means and the means for displaying the exposure value corresponding to the brightness in the predetermined section of the object field include a plurality of display elements arranged in correspondence with each exposure value, means for displaying the plurality of display elements corresponding to the exposure value range, and means for displaying one of the plurality of display elements which corresponds to the exposure value corresponding to the brightness in the predetermined section of the object field.

12. Exposure display device as claimed in claim 11, wherein the plurality of display elements display means includes means for turning on the plurality of display elements, and wherein the means for displaying one of the plurality of display elements includes means for flashing the one display element.

* * * * *